United States Patent
Urtasun et al.

(10) Patent No.: US 11,061,402 B2
(45) Date of Patent: Jul. 13, 2021

(54) SPARSE CONVOLUTIONAL NEURAL NETWORKS

(71) Applicant: UATC, LLC, San Francisco, CA (US)

(72) Inventors: Raquel Urtasun, Toronto (CA); Mengye Ren, Toronto (CA); Andrei Pokrovsky, San Francisco, CA (US); Bin Yang, Toronto (CA)

(73) Assignee: UATC, LLC, Mountain View, CA (US)

( * ) Notice: Subject to any disclaimer, the term of this patent is extended or adjusted under 35 U.S.C. 154(b) by 567 days.

(21) Appl. No.: 15/890,886

(22) Filed: Feb. 7, 2018

(65) Prior Publication Data
US 2019/0146497 A1 May 16, 2019

Related U.S. Application Data

(60) Provisional application No. 62/586,668, filed on Nov. 15, 2017.

(51) Int. Cl.
*G05D 1/00* (2006.01)
*G01S 17/89* (2020.01)
(Continued)

(52) U.S. Cl.
CPC ............ *G05D 1/0088* (2013.01); *G01S 17/86* (2020.01); *G01S 17/89* (2013.01); *G01S 17/931* (2020.01); *G05D 1/0246* (2013.01)

(58) Field of Classification Search
CPC .... G05D 1/0088; G05D 1/0246; G01S 17/86; G01S 17/931; G01S 17/89; G06K 9/00805
See application file for complete search history.

(56) References Cited

U.S. PATENT DOCUMENTS

| 9,286,524 B1* | 3/2016 | Mei | G06K 9/6273 |
| 2006/0162985 A1* | 7/2006 | Tanaka | B60W 40/04 |
| | | | 180/279 |

(Continued)

FOREIGN PATENT DOCUMENTS

EP 3477616 A1 * 5/2019 ............. G05D 1/021

OTHER PUBLICATIONS

Figurnov et al., "Spatially Adaptive Computation Time for Residual Networks", Institute of Electrical and Electronics Engineers Conference on Computer Vision and Pattern Recognition, Honolulu, Hawaii, Jul. 21-26, 2017, pp. 1039-1048.
(Continued)

*Primary Examiner* — Thomas Ingram
(74) *Attorney, Agent, or Firm* — Dority & Manning, P.A.

(57) ABSTRACT

The present disclosure provides systems and methods that apply neural networks such as, for example, convolutional neural networks, to sparse imagery in an improved manner. For example, the systems and methods of the present disclosure can be included in or otherwise leveraged by an autonomous vehicle. In one example, a computing system can extract one or more relevant portions from imagery, where the relevant portions are less than an entirety of the imagery. The computing system can provide the relevant portions of the imagery to a machine-learned convolutional neural network and receive at least one prediction from the machine-learned convolutional neural network based at least in part on the one or more relevant portions of the imagery. Thus, the computing system can skip performing convolutions over regions of the imagery where the imagery is sparse and/or regions of the imagery that are not relevant to the prediction being sought.

16 Claims, 8 Drawing Sheets

(51) Int. Cl.
  *G01S 17/86* (2020.01)
  *G01S 17/931* (2020.01)
  *G05D 1/02* (2020.01)

(56) References Cited

U.S. PATENT DOCUMENTS

| | | | | |
|---|---|---|---|---|
| 2013/0212052 | A1* | 8/2013 | Yu | G06N 3/04 706/25 |
| 2015/0306761 | A1* | 10/2015 | O'Connor | G05D 1/0221 700/250 |
| 2016/0224868 | A1* | 8/2016 | Hsiao | G06K 9/6245 |
| 2017/0132496 | A1* | 5/2017 | Shoaib | G06K 9/66 |

OTHER PUBLICATIONS

Figurnov et al., "Perforatedcnns: Acceleration Through Elimination of Redundant Convolutions", Annual Conference on Neural Information Processing Systems, Barcelona, Spain, Dec. 5-10, 2016, 9 pages.
Franklin, "Optimal Rectangle Covers for Convex Rectilinear Polygons", PhD Thesis, Simon Fraser University, Mar. 1986, 134 pages.
Frerking, "Digital Signal Processing in Communication Systems", Van Nostrand Reinhold, New York, 1994.
Graham et al., "Submanifold Sparse Convolutional Networks", arXiv:1706.01307v1, Jun. 5, 2017, 10 pages.
Han et al., "Learning Both Weights and Connections for Efficient Neural Networks", In Proceedings of the 28th International Conference on Neural Information Processing Systems, Cambridge, Massachusetts, 2015, 9 pages.
Jaderberg et al., "Speeding Up Convolutional Neural Networks with Low Rank Expansions", In British Machine Vision Conference, Nottingham, United Kingdom, Sep. 1-5, 2014, 13 pages.
Lavin et al., "Fast Algorithms for Convolutional Neural Networks", Institute of Electrical and Electronics Engineers Conference on Computer Vision and Pattern Recognition, Las Vegas, Nevada, Jun. 27-30, 2016, pp. 4013-4021.
Li et al., "Pruning Filters for Efficient Convnets", arXiv:1608.08710v3, Mar. 10, 2017, 13 pages.
Li et al., "Not All Pixels are Equal: Difficulty-Aware Semantic Segmentation via Deep Layer Cascade", arXiv:1704.01344v1, Apr. 5, 2017, 11 pages.
Liu et al., "Sparse Convolutional Neural Networks", Institute of Electrical and Electronics Engineers Conference on Computer Vision and Pattern Recognition, Boston, Massachusetts, Jun. 7-12, 2015, pp. 806-814.
Park et al., "Holistic SparseCNN: Forging the Trident of Accuracy, Speed, and Size", arXiv:1608.01409v1, Aug. 4, 2016, 10 pages.
Riegler et al., "OctNet: Learning Deep 3D Representations at High Resolutions", Institute of Electrical and Electronics Engineers Conference on Computer Vision and Pattern Recognition, Honolulu, Hawaii, Jul. 21-26, 2017, pp. 3577-3586.
Uhrig et al., "Sparsity Invariant Cnns", arXiv:1708.06500v2, Aug. 30, 2017, 16 pages.
Wen et al., "Learning Structured Sparsity in Deep Neural Networks", Annual Conference on Neural Information Processing Systems, Barcelona, Spain, Dec. 5-10, 2016, 9 pages.
Winograd, Arithmetic Complexity of Computations, vol. 33, Society for Industrial and Applied Mathematics, Philadelphia, Pennsylvania, 1980, 3 pages.

* cited by examiner

US 11,061,402 B2

SPARSE CONVOLUTIONAL NEURAL NETWORKS

RELATED APPLICATIONS

This application claims priority to and the benefit of U.S. Provisional Patent Application No. 62/586,668, titled "Sparse Convolutional Neural Networks" and filed on Nov. 15, 2017. U.S. Provisional Patent Application No. 62/586,668 is hereby incorporated by reference herein in its entirety.

FIELD

The present disclosure relates generally to machine learning. More particularly, the present disclosure relates to an autonomous vehicle computing system that applies neural networks, such as, for example, convolutional neural networks, to sparse imagery, such as, for example, LIDAR data.

BACKGROUND

An autonomous vehicle is a vehicle that is capable of sensing its environment and navigating with little or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

In some instances, an autonomous vehicle can include or otherwise employ one or more machine-learned models such as, for example, artificial neural networks to comprehend the surrounding environment and/or identify an appropriate motion path through such surrounding environment.

Artificial neural networks (ANNs or "neural networks") are an example class of machine-learned models. Neural networks can be trained to perform a task (e.g., make a prediction) by learning from training examples, without task-specific programming. For example, in image recognition, neural networks might learn to identify images that contain a particular object by analyzing example images that have been manually labeled as including the object or labeled as not including the object.

A neural network can include a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

One example class of neural networks is convolutional neural networks. In some instances, a convolutional neural network can be deep, feed-forward artificial neural networks that include one or more convolutional layers. For example, a convolutional neural network can include tens of layers, hundreds of layers, etc. Each convolutional layer can perform convolutions over input data using learned filters. Filters can also be referred to as kernels. Convolutional neural networks have been successfully applied to analyzing imagery of different types, including, for example, visual imagery.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system includes one or more processors. The computing system includes a machine-learned convolutional neural network. The computing system includes one or more non-transitory computer-readable media that store instructions that, when executed by the one or more processors, cause the computing system to perform operations. The operations include obtaining imagery. The operations include extracting one or more relevant portions of the imagery. The one or more relevant portions are less than an entirety of the imagery. The operations include providing each of the one or more relevant portions of the imagery to the machine-learned convolutional neural network. The machine-learned convolutional neural network performs one or more convolutions respectively on each of the one or more relevant portions. The operations include receiving a prediction from the machine-learned convolutional neural network based at least in part on the one or more convolutions respectively performed on each of the one or more relevant portions.

Another example aspect of the present disclosure is directed to an autonomous vehicle that includes the computer system described above. Another example aspect of the present disclosure is directed to a computer-implemented method that includes performing the operations described above. Other aspects of the present disclosure are directed to various systems, apparatuses, non-transitory computer-readable media, user interfaces, and electronic devices.

Another example aspect of the present disclosure is directed to one or more non-transitory computer-readable media that store a machine-learned convolutional neural network configured to process imagery captured by one or more sensors of an autonomous vehicle. The machine-learned convolutional neural network includes one or more sparse convolutional blocks. Each of the one or more sparse convolutional blocks includes a gather layer configured to gather a plurality of non-sparse blocks from a sparse data source and to stack the plurality of non-sparse blocks to form an input tensor. Each of the one or more sparse convolutional blocks includes one or more convolutional layers configured to perform one or more convolutions on the input tensor to generate an output tensor that contains a plurality of non-sparse output blocks. Each of the one or more sparse convolutional blocks includes a scatter layer configured to scatter the plurality of non-sparse output blocks of the output tensor back to the sparse data source.

Another example aspect of the present disclosure is directed to an autonomous vehicle. The autonomous vehicle includes one or more sensors that capture imagery; one or more processors; a machine-learned convolutional neural network; and one or more non-transitory computer-readable media that store instructions that, when executed by the one or more processors, cause the autonomous vehicle to perform operations. The operations include obtaining the imagery captured by the one or more sensors of the autonomous vehicle. The operations include extracting one or more relevant portions of the imagery. The one or more relevant portions are less than an entirety of the imagery. The operations include providing each of the one or more relevant portions of the imagery to the machine-learned convolutional neural network. The machine-learned convolutional neural network performs one or more convolutions respectively on each of the one or more relevant portions. The operations include receiving a prediction from the machine-learned convolutional neural network based at least in part on the one or more convolutions respectively performed on each of the one or more relevant portions.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
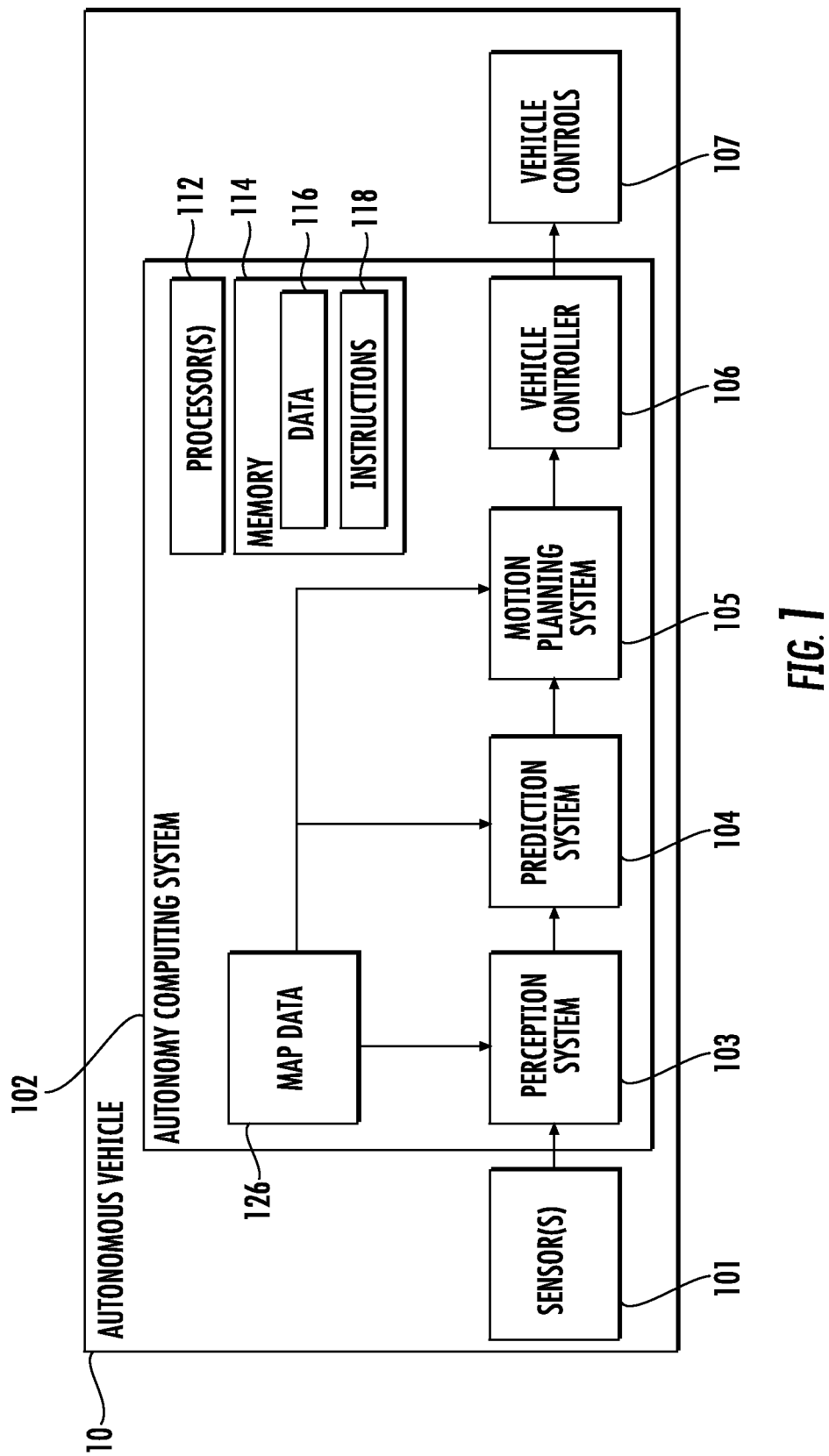
FIG. 1 depicts a block diagram of an example autonomous vehicle according to example embodiments of the present disclosure.

Example aspects of the present disclosure are directed to systems and methods that apply neural networks such as, for example, convolutional neural networks, to sparse imagery in an improved manner. For example, the systems and methods of the present disclosure can be included in or otherwise leveraged by an autonomous vehicle. In one example, a computing system can extract one or more relevant portions from imagery, where the relevant portions are less than an entirety of the imagery. As one example, the one or more relevant portions of the imagery can include one or more non-sparse regions of the imagery. The computing system can provide each of the one or more relevant portions of the imagery to a machine-learned convolutional neural network and receive at least one prediction from the machine-learned convolutional neural network based at least in part on the one or more relevant portions of the imagery. Thus, the computing system can skip performing convolutions over regions of the imagery where the imagery is sparse and/or regions of the imagery that are not relevant to the prediction being sought. By eliminating the performance of convolutions over non-relevant regions of the imagery, the systems and methods of the present disclosure can significantly reduce the amount of processing required to implement the machine-learned model and, correspondingly, improve the speed at which predictions can be obtained.

More particularly, standard deep convolutional neural networks (CNNs) typically apply convolutional operators everywhere on the feature map across hundreds of layers, which entails high computation cost for real time applications. However, as recognized by the present disclosure, for many problems such as object detection and semantic segmentation, a mask (e.g., an attention mask) can be generated or otherwise obtained which limits the areas where computation is performed. For example, the mask can be generated based on the nature of the problem or by segmentation models at a lower resolution. As one example, in some implementations, for autonomous driving, object detectors only need to spend computation to detect objects that are on the road or nearby areas. As another example, the mask can be predicted by using a relatively cheap network such as saliency prediction and objectness prior or using a part of the main network itself.

According to an aspect of the present disclosure, such masks can be used to skip computation in the main network. In particular, systems and methods of the present disclosure leverage the sparsity of the structure of the inputs to perform a novel tiling-based sparse convolutional algorithm. Further, the present disclosure proposes Sparse Blocks Networks (SBNet), which compute convolution on a blockwise decomposition of the mask. These sparse convolution algorithms and networks have been verified as being effective for performance of camera and/or LIDAR-based object detection and semantic segmentation tasks, which have particular applicability to autonomous vehicle perception and control problems. Furthermore, significant wall-clock speed-ups are possible on standard detector networks compared to dense convolution, with little to no loss in accuracy (e.g., detection performance).

In some implementations, an autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle can include a computing system that assists in controlling the autonomous vehicle. In some implementations, the autonomous vehicle computing system can include a perception system, a prediction system, and a motion planning system that cooperate to perceive the surrounding environment of the autonomous vehicle and determine one or more motion plans for controlling the motion of the autonomous vehicle accordingly. The autonomous vehicle computing system can include one or more processors as well as one or more non-transitory computer-readable media that collectively store instructions that, when executed by the one or more processors, cause the autonomous vehicle computing system to perform various operations as described herein.

In particular, in some implementations, the perception system can receive sensor data from one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle.

In addition to the sensor data, the perception system can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the computing system in comprehending and perceiving its surrounding environment and its relationship thereto.

The perception system can identify one or more objects that are proximate to the autonomous vehicle based on sensor data received from the one or more sensors and/or the map data. In particular, in some implementations, the perception system can provide, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding polygon); class (e.g., vehicle vs. pedestrian vs. bicycle), and/or other state information.

The prediction system can receive the state data and can predict one or more future locations for the object(s) identified by the perception system. For example, various prediction techniques can be used to predict the one or more future locations for the object(s) identified by the perception system. The prediction system can provide the predicted future locations of the objects to the motion planning system.

The motion planning system can determine one or more motion plans for the autonomous vehicle based at least in part on the state data provided by the perception system and/or the predicted one or more future locations for the objects. Stated differently, given information about the current locations of proximate objects and/or predictions about the future locations of proximate objects, the motion planning system can determine motion plan(s) for the autonomous vehicle that best navigate the vehicle relative to the objects at their current and/or future locations.

As an example, in some implementations, the motion planning system operates to generate new autonomous motion plan(s) for the autonomous vehicle multiple times per second. Each new autonomous motion plan can describe motion of the autonomous vehicle over the next several seconds (e.g., 5 seconds). Thus, in some example implementations, the motion planning system continuously operates to revise or otherwise generate a short-term motion plan based on the currently available data.

Once the optimization planner has identified the optimal motion plan (or some other iterative break occurs), the optimal candidate motion plan can be selected and executed by the autonomous vehicle. For example, the motion planning system can provide the selected motion plan to a vehicle controller that controls one or more vehicle controls (e.g., actuators that control gas flow, steering, braking, etc.) to execute the selected motion plan until the next motion plan is generated.

More generally, many systems, such as, for example, the autonomous vehicle control systems described above, can include, employ, or otherwise leverage one or more convolutional neural networks in order to process imagery. Given some input imagery, a convolutional neural network can make one or more predictions regarding the input imagery. As examples, given input imagery that depicts or otherwise describes a surrounding environment of an autonomous vehicle, an autonomous vehicle control system (e.g., perception system, prediction system, motion planning system, etc.) can employ a convolutional neural network to provide predictions on the basis of such input imagery. As examples, the predictions can include predictions that detect objects (e.g., additional vehicles, pedestrians, bicyclists, etc.) depicted by the imagery; predictions that describe a predicted future trajectory for an object depicted by the imagery; and/or other tasks, including, for example, motion planning or map automation.

In some instances, particularly those encountered by autonomous vehicle control systems, the input imagery is sparse in nature. As one example, the input imagery can include LIDAR imagery produced by a LIDAR system. For example, the LIDAR imagery can be a three-dimensional point cloud, where the point cloud is highly sparse. Stated differently, the point cloud can describe the locations of detected objects in three-dimensional space and, for many (most) locations in three-dimensional space, there was not an object detected at such location. Additional examples of input imagery include imagery captured by one or more cameras or other sensors including, as examples, visible spectrum imagery (e.g., humanly-perceivable wavelengths); infrared imagery; imagery that depicts RADAR data produced by a RADAR system; heat maps; data visualizations; or other forms of imagery.

Typically, a convolutional neural network contains a number of layers (e.g., tens to hundreds) and each layer is computed sequentially (e.g., "one by one" after another) in order to provide an output. For example, computing a convolutional layer can include performing a convolution of a kernel over each and every location in the imagery.

Thus, when applied to sparse inputs such as sparse imagery, the convolutional neural network will perform convolutions over the sparse regions. However, this represents a significant computational and time expense that does not provide correspondingly significant benefits (e.g., does not valuably impact or contribute to the ultimate prediction).

As such, according to an aspect of the present disclosure, a computing system can extract one or more relevant portions from imagery, where the relevant portions are less than an entirety of the imagery. As one example, the one or more relevant portions of the imagery can include one or more non-sparse regions of the imagery. The computing system can provide each of the one or more relevant portions of the imagery to a machine-learned convolutional neural network and receive at least one prediction from the machine-learned convolutional neural network based at least in part on the one or more relevant portions of the imagery.

Thus, the computing system can skip performing convolutions over regions of the imagery where the imagery is sparse or regions of the imagery that are not relevant to the prediction being sought. By eliminating the performance of convolutions over non-relevant regions of the imagery, the systems and methods of the present disclosure can significantly reduce the amount of processing required to implement the machine-learned model and, correspondingly, improve the speed at which predictions can be obtained.

In some implementations, to extract the one or more relevant portions of the imagery, a computing system can identify one or more non-sparse regions of the imagery. The computing system can extract one or more relevant portions of the imagery that respectively correspond to the one or more non-sparse regions. The non-sparse regions can be spatially non-sparse or temporally non-sparse.

In some implementations, to extract the one or more relevant portions of the imagery, the computing system can generate a binary mask. The binary mask can classify each of a plurality of sections of the imagery as either sparse or non-sparse. For example, the plurality of sections of the imagery can correspond to pixels or voxels of the imagery. Thus, in some examples, the binary mask can indicate, for each pixel or voxel included in the imagery, whether such pixel/voxel is sparse or non-sparse. The computing system can determine the one or more relevant portions of the imagery based at least in part on the binary mask.

As one example, the computing system can generate the binary mask by dividing the imagery into the plurality of sections (e.g., pixels or voxels). The computing system can determine, for each of the plurality of sections, an amount of data included in such section. The computing system can classify each section as either sparse or non-sparse based at least in part on the amount of data included in such section. For example, in some implementations, if any amount of data is included in the section (e.g., greater than zero), then the computing system can classify such section as non-sparse, so that only sections that include no data at all are classified as sparse. As another example, in some implementations, the computing system can compare the amount of data included in a section to a threshold amount of data (e.g., five data points) to determine whether such section is sparse or non-sparse.

To provide one example, in some implementations, the input imagery can be a three-dimensional point cloud of LIDAR data. To generate the binary mask, the three-dimensional space can be divided into a plurality of voxels. The computing system can determine the amount of data (e.g., the number of LIDAR data points) included in each voxel and can classify each voxel as either sparse or non-sparse based on the amount of data included in such voxel (e.g., as described above using a threshold of zero or of some value greater than zero). Thus, in such example, the binary mask can be a three-dimensional mask that classifies each voxel in three-dimensional space as sparse or non-sparse. This technique can also be applied to various other forms of three-dimensional imagery other than LIDAR point clouds.

In another example, in some implementations, the input imagery can be the three-dimensional point cloud of LIDAR data but the imagery can be preprocessed prior to generation of the binary mask. As one example, the three-dimensional point can be preprocessed by projecting the three-dimensional point cloud onto a two-dimensional view (e.g., a top-down or "bird's eye" view). Other preprocessing can optionally be performed such as, for example, removing outliers, removing points that correspond to the ground prior to projection, removing points associated with known objects already included in a map, or other preprocessing techniques. The binary mask can then be generated with respect to the two-dimensional view. For example, the two-dimensional view can be divided into pixels and each pixel can be classified as sparse or non-sparse based on the number of data points included in such pixel.

Alternatively or additionally to the mask generation techniques described above, in some implementations, the computing system can include or leverage a machine-learned mask generation model to generate the binary mask. For example, the computing system can input the imagery into the machine-learned mask generation model and, in response, receive the binary mask as an output of the machine-learned mask generation model.

As one example, the machine-learned mask generation model can be a neural network, such as, for example, a convolutional neural network. For example, the machine-learned mask generation model can be viewed as an initial portion of a larger convolutional neural network that provides the prediction based on the relevant portions of the imagery. In some implementations, the machine-learned mask generation model can be jointly trained with the convolutional neural network that provides the prediction based on the relevant portions of the imagery in an end-to-end fashion (e.g., by backpropagating an error through all of the layers sequentially).

In one example, the machine-learned mask generation model can be trained or pre-trained based at least in part on training examples that include training imagery annotated with ground-truth labels of sparse sections and non-sparse sections (e.g., a training image and its corresponding "correct" mask). For example, the preprocessing techniques described above (e.g., projection plus amount of data analysis) can be used to generate training data for the machine-learned mask generation model. In another example, the training examples can include segmentation masks used to pre-train the mask generation portion.

In some implementations, at training time, an approximation of a sparse convolution can be performed by directly multiplying the results with a dense binary mask. In some implementations, at training time, the mask is not constrained to be binary in nature, while the mask is constrained or processed to be binary at inference time. This can avoid the problem of non-differentiable binary variables.

As another example technique to generate the binary mask, in some implementations, the computing system can generate the binary mask by identifying a region of interest within the imagery. The computing system can classify each section included in the region of interest as non-sparse while classifying each section that is not included in the region of interest as sparse.

As one example, the region of interest can be based at least in part on context data associated with an autonomous vehicle. For example, the context data associated with the autonomous vehicle can include a heading of the autonomous vehicle, a trajectory associated with the autonomous vehicle, and/or other state data associated with the autonomous vehicle or other objects in the surrounding environment.

Thus, to provide one example, portions of the imagery that depict regions of the surrounding environment that are "in front of" the autonomous vehicle and/or regions of the surrounding environment through which the autonomous vehicle expects to travel can be considered to be the region of interest. As such, portions of the imagery that correspond to regions of the surrounding environment that are behind the autonomous vehicle can be classified as sparse and not-convolved over, thereby improving processing speed and efficiency. Further, this example implementation can assist in reducing a delay or latency associated with collection of LIDAR data, since the LIDAR system is not required to perform a complete 360 degree "sweep" but instead the LIDAR data can be collected and processed as soon as the LIDAR system has captured imagery that corresponds to the region of interest.

As another example, the region of interest can be based at least in part on a confidence metric associated with one or more predictions previously obtained relative to a scene depicted by the imagery. For example, portions of the imagery for which the corresponding predictions have low confidence can be included in the region of interest while portions of the imagery for which the corresponding predictions have high confidence can be excluded from the region of interest. In such fashion, portions of the imagery that have already been analyzed with high-confidence can be "ignored" since one would expect any further predictions from the convolutional neural network to be redundant, while portions of the imagery that have already been analyzed with low-confidence can be included in the region of interest so that the convolutional neural network provides an additional prediction with respect to such portions as "a second opinion".

To provide an example, an autonomous vehicle can include multiple sensors systems that have different modalities (e.g., cameras versus LIDAR system). First imagery captured by a first sensor (e.g., a camera) can be analyzed to receive a first set of predictions (e.g., predictions that detect objects in the surrounding environment as depicted by the camera imagery). This first set of predictions can have a confidence metric associated with each prediction. For example, a first detected object (e.g., bicyclist) can have a high confidence while a second detected object (e.g., pedestrian) or lack of detected object can have a low confidence assigned thereto. As such, a region of interest can be defined for second imagery captured by a second sensor (e.g., LIDAR system) based on the confidence metrics applied to the first imagery. For example, portions of the second imagery that may correspond to the first detected object may be excluded from the region of interest while portions of the second imagery that correspond to the second detected object (or lack of detected object) may be included in the region of interest. As such, portions of the imagery that correspond to previous predictions of high confidence can be classified as sparse and not-convolved over, thereby improving processing speed and efficiency.

As another example, the region of interest can be based at least in part on an attention mechanism that tracks, in an iterative fashion, where within the scene the attention of the processing system should be focused. For example, the locations at which portions of imagery were determined to be relevant in a past iteration can impact where the system searches for relevant imagery in a subsequent iteration (e.g., by guiding the region of interest based on the past imagery and/or predictions derived from the past imagery).

In some implementations, the region of interest-based masking techniques can be used in addition to the other masking techniques (e.g., pixel-by-pixel data analysis) to generate a combined, final mask. For example, the final binary mask can be an intersection of the multiple initial masks.

Once the computing system has generated the binary mask, the computing system can determine one or more relevant portions of the imagery based at least in part on the binary mask.

As one example, in some implementations, the computing system can determine the one or more relevant portions of the imagery based at least in part on the binary mask by partitioning the imagery into a plurality of portions and classifying each portion as relevant or not relevant.

For example, each portion can contain two or more of the plurality of sections (e.g., pixel/voxel). The portions can be overlapping or non-overlapping. The portions can be uniformly sized or non-uniformly sized. The portions can have a predefined size or can be dynamically fitted around the non-sparse sections. The size of the portions can be different and individually optimized for different applications.

In one example, the portions can be predefined and uniformly sized rectangles or boxes (e.g., depending on whether the imagery is two-dimensional or three-dimensional), which can also be referred to as "tiles". For example, each tile can cover a 9 pixel by 9 pixel area.

The computing system can classify each portion as either relevant or not relevant based at least in part on the respective classifications of the sections contained in such portion as either sparse or non-sparse. For example, in some implementations, if any amount of the sections included in the portion were classified as non-sparse, then the computing system can classify such portion as relevant, so that only portions that include no sections that were classified as non-sparse are classified as non-relevant. As another example, in some implementations, the computing system can compare the number of sections classified as non-sparse included in a portion to a threshold number of sections (e.g., three sections) to determine whether such portion is relevant or non-relevant.

In another example, the relevant portions can be fitted around the non-sparse sections using a clustering/fitting algorithm. For example, the algorithm can seek to minimize both a total number of relevant portions and a total area covered by the relevant portions.

Alternatively or additionally to the techniques for detecting relevant portions described above, in some implementations, the computing system can include or leverage a machine-learned portion extraction model to identify the relevant portions. For example, the computing system can input the imagery into the machine-learned portion extraction model and, in response, receive identification (e.g., as coordinates of bounding boxes, bounding rectangles, or other bounding shapes) as an output of the machine-learned portion extraction model.

As one example, the machine-learned mask portion extraction can be a neural network, such as, for example, a convolutional neural network. For example, the machine-learned portion extraction model can be viewed as an initial portion of a larger convolutional neural network that provides the prediction based on the relevant portions of the imagery. In some implementations, the machine-learned portion extraction model can be jointly trained with the convolutional neural network that provides the prediction based on the relevant portions of the imagery in an end-to-end fashion (e.g., by backpropagating an error through all of the layers sequentially). In some examples, the portion extraction model can be trained on training examples that include imagery annotated with ground-truth labels that describe the location of relevant portions within the imagery.

Thus, portions (e.g., tiles) of the input imagery can be designated as relevant and can be extracted from the imagery for input into the convolutional neural network. For example, extracting the relevant portions of the imagery can include cropping the imagery or otherwise isolating the imagery data that corresponds to each relevant portion.

Once the one or more relevant regions have been extracted, the computing system can provide each relevant region to a convolutional neural network. In some implementations, providing each relevant region to the convolutional neural network can include stacking the one or more relevant portions in a depth-wise fashion to form a tensor and inputting the tensor into the convolutional neural network. For example, the imagery can be re-shaped into a batch dimension. For example, a GPU-accelerated library (e.g., CUDNN) can be used to perform convolutions on the relevant regions.

In some implementations, the computing system can provide each relevant region to the convolutional neural network by inputting each of the one or more relevant portions into respective parallel instances of the machine-learned convolutional neural network in parallel.

In some implementations, the machine-learned convolutional neural network performs only valid convolutions in which a kernel size is smaller than a corresponding portion size. In some implementations, all convolutions after a first convolution can be valid. Performing valid convolutions can eliminate the need to perform costly read/write operations since there are not overlapping portions which need to be updated. In some implementations, if same convolutions are performed, the input can be padded with surrounding zeros.

The computing system can receive a prediction from the convolutional neural network. As one example, the prediction can include detection of imagery data that correspond to an object in a surrounding environment of the autonomous vehicle. As another example, the prediction can include a predicted trajectory for an object in a surrounding environment of the autonomous vehicle.

In some implementations, receiving the prediction can include patching one or more prediction results to the imagery, where the one or more prediction results respectively correspond to the one or more relevant portions.

In some implementations, the machine-learned convolutional neural network includes one or more residual blocks. For example, a residual block can sum its output with the inputs. For example, a residual block can include a convolutional layer, a batch normalization layer, and/or a rectification layer (e.g., ReLU). According to an aspect of the present disclosure, the residual block can be configured to provide a sparse update to hidden features. In particular, the residual block can implement all three of its layers without pasting the results back to the imagery. As such, the residual block does not need to merge or write back at each layer, but can write back directly to the original input (e.g., tensor) at the end of the block by adding to the existing input. This has a number of technical benefits, including increased processing speed due to the sparse updates and elimination of read/write operations.

According to another aspect of the present disclosure, in some implementations, the size of a kernel can be larger than a portion size of the one or more relevant portions. For example, in some implementations, the kernel size can be roughly the same as the size of the imagery as a whole. In some of such implementations, sparsity can be enforced on the kernel based on the one or more relevant portions.

In particular, the locations of identified one or more relevant portions can be used to enforce sparsity on a larger kernel. For example, the computing system can define one or more relevant kernel portions within the kernel that correspond to the one or more relevant portions extracted from the imagery. Computations that correspond to portions of the kernel that are not included within such relevant kernel portions can be omitted, thereby saving processing resources and improving processing speed.

To provide a simplified example for the purpose of illustration, an input image might have an image size of M×N, while a kernel included in the convolutional neural network has a kernel size of (M−1)×(N−1). To continue the example, one or more relevant portions of the input image can be identified, where each relevant portion has a portion size of, for example, (0.1M)×(0.1N). Rather than computing the entirety of the kernel, which would include a significant number of sparse computations, corresponding relevant portions of the kernel can be defined (e.g., based on matching locations when the kernel is overlaid upon the input image) and computations can be performed only for the relevant portions of the kernel as respectively applied to the relevant portions of the image. For example, the relevant portions of the kernel can be sized to be valid convolutions or same convolutions.

The systems and methods of the present disclosure provide a number of technical effects and benefits. As one example, the techniques described herein enable a computing system to skip performing convolutions over regions of imagery where the imagery is sparse or regions of the imagery that are not relevant to the prediction being sought. By eliminating the performance of convolutions over non-relevant regions of the imagery, the systems and methods of the present disclosure can significantly reduce the amount of processing required to implement the machine-learned model and, correspondingly, improve the speed at which predictions can be obtained.

Although the present disclosure is discussed with particular reference to autonomous vehicles, the systems and methods described herein are applicable to any convolutional neural networks used for any purpose. Further, although the present disclosure is discussed with particular reference to convolutional networks, the systems and methods described herein can also be used in conjunction with many different forms of machine-learned models in addition or alternatively to convolutional neural networks.

With reference now to the Figures, example embodiments of the present disclosure will be discussed in further detail.

Example Devices and Systems

FIG. 1 depicts a block diagram of an example autonomous vehicle 10 according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft, rail-based vehicles, etc.).

The autonomous vehicle 10 includes one or more sensors 101, an autonomy computing system 102, and one or more vehicle controls 107. The autonomy computing system 102 can assist in controlling the autonomous vehicle 10. In particular, the autonomy computing system 102 can receive sensor data from the one or more sensors 101, attempt to comprehend the surrounding environment by performing various processing techniques on data collected by the sensors 101, and generate an appropriate motion path through such surrounding environment. The autonomy computing system 102 can control the one or more vehicle controls 107 to operate the autonomous vehicle 10 according to the motion path.

The autonomy computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause autonomy computing system 102 to perform operations.

As illustrated in FIG. 1, the autonomy computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the autonomy computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the autonomy computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at such locations.

In particular, according to an aspect of the present disclosure, the motion planning system 105 can evaluate one or more cost functions for each of one or more candidate motion plans for the autonomous vehicle 10. For example, the cost function(s) can describe a cost (e.g., over time) of adhering to a particular candidate motion plan and/or describe a reward for adhering to the particular candidate motion plan. For example, the reward can be of opposite sign to the cost.

More particularly, to evaluate the one or more cost functions, the motion planning system 105 can determine a plurality of features that are within a feature space. For example, the status of each feature can be derived from the state of the vehicle and/or the respective states of other objects or aspects of the surrounding environment.

The motion planning system 105 can determine the plurality of features for each vehicle state included in the current candidate motion plan. The motion planning system 105 can determine the plurality of features for each vehicle state included in the candidate motion plan.

The motion planning system 105 can evaluate one or more cost functions based on the determined features. For example, in some implementations, the one or more cost functions can include a respective linear cost for each feature at each state.

The motion planning system 105 can iteratively optimize the one or more cost functions to minimize a total cost associated with the candidate motion plan. For example, the motion planning system 105 can include an optimization planner that iteratively optimizes the one or more cost functions.

Following optimization, the motion planning system 105 can provide the optimal motion plan to a vehicle controller 106 that controls one or more vehicle controls 107 (e.g., actuators or other devices that control gas flow, steering, braking, etc.) to execute the optimal motion plan.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

In various implementations, one or more of the perception system 103, the prediction system 104, and/or the motion planning system 105 can include or otherwise leverage one or more machine-learned models such as, for example convolutional neural networks.

Figure 2:
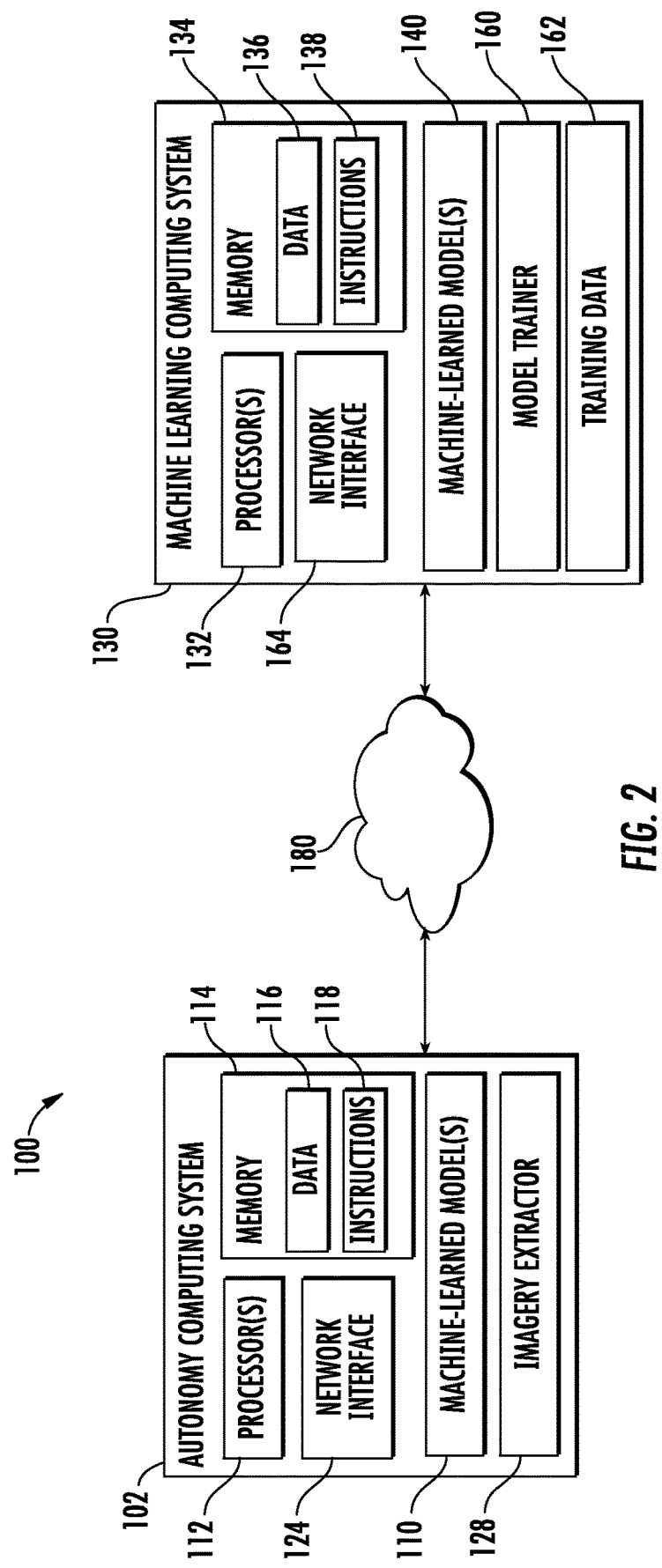
FIG. 2 depicts a block diagram of an example computing system according to example embodiments of the present disclosure.

FIG. 2 depicts a block diagram of an example computing system 100 according to example embodiments of the present disclosure. The example system 100 includes a computing system 102 and a machine learning computing system 130 that are communicatively coupled over a network 180.

In some implementations, the computing system 102 can perform image extraction and analysis. In some implementations, the computing system 102 can be included in an autonomous vehicle. For example, the computing system 102 can be on-board the autonomous vehicle. In other implementations, the computing system 102 is not located on-board the autonomous vehicle. For example, the computing system 102 can operate offline to perform image extraction and analysis. The computing system 102 can include one or more distinct physical computing devices.

The computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. The data 116 can include, for instance, imagery captured by one or more sensors or other forms of imagery, as described herein. In some implementations, the computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112.

For example, the memory 114 can store instructions 118 that when executed by the one or more processors 112 cause the one or more processors 112 to perform any of the operations and/or functions described herein, including, for example, image extraction and analysis.

The computing system 102 can also include an imagery extractor 128. The imagery extractor 128 can extract one or more portions (e.g., relevant portions) from imagery. For example, the imagery extractor 128 can perform some or all of steps 402 through 406 of method 400 of FIG. 4. The imagery extractor 128 can be implemented in hardware, firmware, and/or software controlling one or more processors.

According to an aspect of the present disclosure, the computing system 102 can store or include one or more machine-learned models 110. As examples, the machine-learned models 110 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, and/or other forms of neural networks, or combinations thereof.

In some implementations, the computing system 102 can receive the one or more machine-learned models 110 from the machine learning computing system 130 over network 180 and can store the one or more machine-learned models 110 in the memory 114. The computing system 102 can then use or otherwise implement the one or more machine-learned models 110 (e.g., by processor(s) 112). In particular, the computing system 102 can implement the machine learned model(s) 110 to perform image analysis. In one example, the imagery can include imagery captured by one or more sensors of an autonomous vehicle and the machine-learned model (e.g., convolutional neural network) can detect object(s) in a surrounding environment of the autonomous vehicle, as depicted by the imagery. In another example, the imagery can include imagery captured by one or more sensors of an autonomous vehicle and the machine-learned model (e.g., convolutional neural network) can predict a trajectory for an object in a surrounding environment of the autonomous vehicle.

The machine learning computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage media, such as RAM, ROM, EEPROM, EPROM, one or more memory devices, flash memory devices, etc., and combinations thereof.

The memory 134 can store information that can be accessed by the one or more processors 132. For instance, the memory 134 (e.g., one or more non-transitory computer-readable storage mediums, memory devices) can store data 136 that can be obtained, received, accessed, written, manipulated, created, and/or stored. The data 136 can include, for instance, imagery as described herein. In some implementations, the machine learning computing system 130 can obtain data from one or more memory device(s) that are remote from the system 130.

The memory 134 can also store computer-readable instructions 138 that can be executed by the one or more processors 132. The instructions 138 can be software written in any suitable programming language or can be implemented in hardware. Additionally, or alternatively, the instructions 138 can be executed in logically and/or virtually separate threads on processor(s) 132.

For example, the memory 134 can store instructions 138 that when executed by the one or more processors 132 cause the one or more processors 132 to perform any of the operations and/or functions described herein, including, for example, image extraction and analysis.

In some implementations, the machine learning computing system 130 includes one or more server computing devices. If the machine learning computing system 130 includes multiple server computing devices, such server computing devices can operate according to various computing architectures, including, for example, sequential computing architectures, parallel computing architectures, or some combination thereof.

In addition or alternatively to the model(s) 110 at the computing system 102, the machine learning computing system 130 can include one or more machine-learned models 140. As examples, the machine-learned models 140 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 130 can communicate with the computing system 102 according to a client-server relationship. For example, the machine learning computing system 140 can implement the machine-learned models 140 to provide a web service to the computing system 102. For example, the web service can provide image extraction and analysis.

Thus, machine-learned models 110 can located and used at the computing system 102 and/or machine-learned models 140 can be located and used at the machine learning computing system 130.

In some implementations, the machine learning computing system 130 and/or the computing system 102 can train the machine-learned models 110 and/or 140 through use of a model trainer 160. The model trainer 160 can train the machine-learned models 110 and/or 140 using one or more training or learning algorithms. One example training technique is backwards propagation of errors. In some implementations, the model trainer 160 can perform supervised training techniques using a set of labeled training data. In other implementations, the model trainer 160 can perform unsupervised training techniques using a set of unlabeled training data. The model trainer 160 can perform a number of generalization techniques to improve the generalization capability of the models being trained. Generalization techniques include weight decays, dropouts, or other techniques.

In particular, the model trainer 160 can train a machine-learned model 110 and/or 140 based on a set of training data 162. The training data 162 can include, for example, training images labelled with a "correct" prediction. The model trainer 160 can be implemented in hardware, firmware, and/or software controlling one or more processors.

The computing system 102 can also include a network interface 124 used to communicate with one or more systems or devices, including systems or devices that are remotely located from the computing system 102. The network interface 124 can include any circuits, components, software, etc. for communicating with one or more networks (e.g., 180). In some implementations, the network interface 124 can include, for example, one or more of a communications controller, receiver, transceiver, transmitter, port, conductors, software and/or hardware for communicating data. Similarly, the machine learning computing system 130 can include a network interface 164.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

FIG. 2 illustrates one example computing system 100 that can be used to implement the present disclosure. Other computing systems can be used as well. For example, in some implementations, the computing system 102 can include the model trainer 160 and the training dataset 162. In such implementations, the machine-learned models 110 can be both trained and used locally at the computing system 102. As another example, in some implementations, the computing system 102 is not connected to other computing systems.

In addition, components illustrated and/or discussed as being included in one of the computing systems 102 or 130 can instead be included in another of the computing systems 102 or 130. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Simplified Example Mask Generation

Figure 3C:
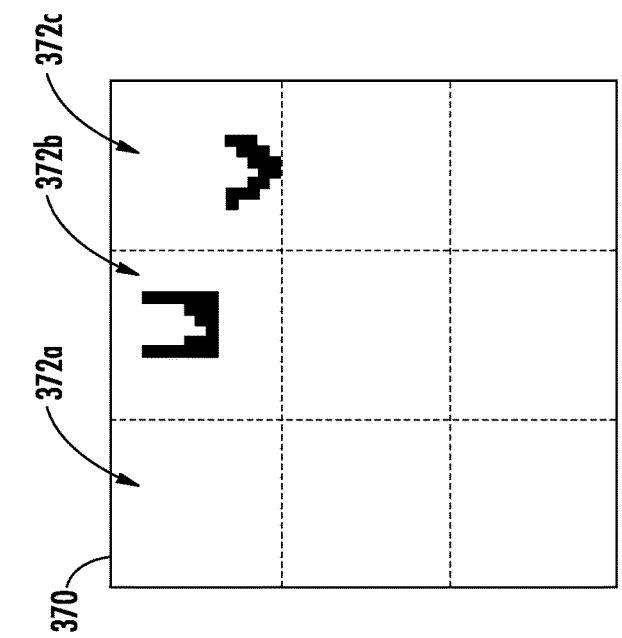
FIG. 3C depicts a graphical diagram of example image portions according to example embodiments of the present disclosure.
Figure 3B:
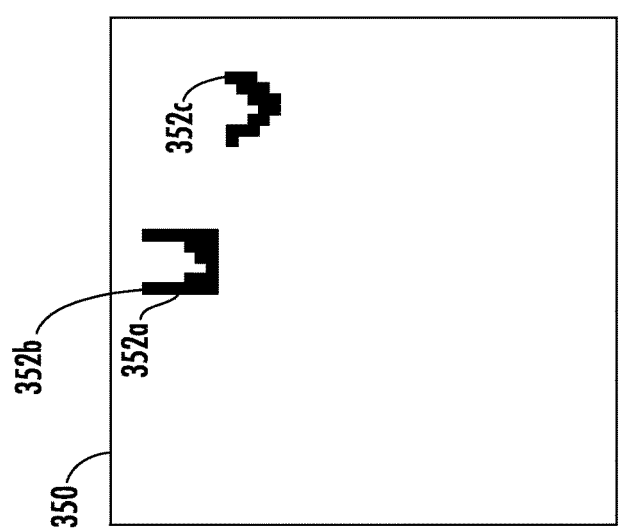
FIG. 3B depicts a graphical diagram of an example binary mask according to example embodiments of the present disclosure.
Figure 3A:
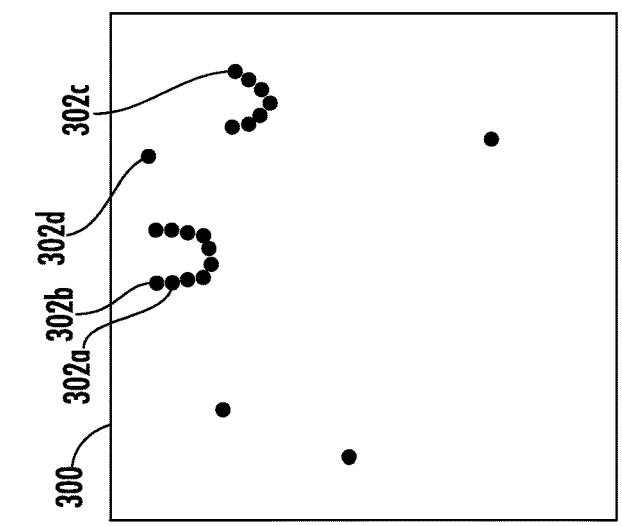
FIG. 3A depicts a graphical diagram of example LIDAR imagery according to example embodiments of the present disclosure.

FIGS. 3A-C provide example illustrations of various stages of an example processing pipeline. FIG. 3A depicts a graphical diagram of example LIDAR imagery 300 according to example embodiments of the present disclosure. The imagery 300 is primarily sparse but does include a number of pixels 302a-d that have are non-sparse.

More particularly, in some instances, particularly those encountered by autonomous vehicle control systems, the input imagery is sparse in nature. As one example, the input imagery can include LIDAR imagery produced by a LIDAR system. For example, the LIDAR imagery can be a three-dimensional point cloud, where the point cloud is highly sparse. Stated differently, the point cloud can describe the locations of detected objects in three-dimensional space and, for many (most) locations in three-dimensional space, there was not an object detected at such location. Additional examples of input imagery include imagery captured by one or more cameras or other sensors including, as examples, visible spectrum imagery (e.g., humanly-perceivable wavelengths); infrared imagery; imagery that depicts RADAR data produced by a RADAR system; heat maps; data visualizations; or other forms of imagery.

In some implementations, the input imagery can be the three-dimensional point cloud of LIDAR data but the imagery can be preprocessed prior to generation of the binary mask. As one example, the three-dimensional point can be preprocessed by projecting the three-dimensional point cloud onto a two-dimensional view (e.g., a top-down or "bird's eye" view). Other preprocessing can optionally be performed such as, for example, removing outliers, removing points that correspond to the ground prior to projection, removing points associated with known objects already included in a map, or other preprocessing techniques. A binary mask can then be generated with respect to the two-dimensional view. For example, the two-dimensional view can be divided into pixels and each pixel can be classified as sparse or non-sparse based on the number of data points included in such pixel. See, for example, imagery 300 of FIG. 3A.

FIG. 3B depicts a graphical diagram of an example binary mask 350 according to example embodiments of the present disclosure. The binary mask is primarily sparse, but does include a number of sections 352a-c that are non-sparse. Thus, for example, the pixels 302a-c of imagery 300 resulted in the corresponding sections 352a-c of the mask 350 being designated as non-sparse, while the pixel 302d of the imagery did not result in the corresponding section of the mask 350 being designated as non-sparse. This may be, for example, that pixel 302d was identified as an outlier or, as another example, may have failed to have enough data associated therewith to meet a threshold for designation as non-sparse.

More particularly, in some implementations, to extract the one or more relevant portions of the imagery, the computing system can generate a binary mask. The binary mask can classify each of a plurality of sections of the imagery as either sparse or non-sparse. For example, the plurality of sections of the imagery can correspond to pixels or voxels of the imagery. Thus, in some examples, the binary mask can indicate, for each pixel or voxel included in the imagery, whether such pixel/voxel is sparse or non-sparse. The computing system can determine the one or more relevant portions of the imagery based at least in part on the binary mask.

As one example, the computing system can generate the binary mask by dividing the imagery into the plurality of sections (e.g., pixels or voxels). The computing system can determine, for each of the plurality of sections, an amount of data included in such section. The computing system can classify each section as either sparse or non-sparse based at least in part on the amount of data included in such section. For example, in some implementations, if any amount of data is included in the section (e.g., greater than zero), then the computing system can classify such section as non-sparse, so that only sections that include no data at all are classified as sparse. As another example, in some implementations, the computing system can compare the amount of data included in a section to a threshold amount of data (e.g., five data points) to determine whether such section is sparse or non-sparse.

To provide one example, in some implementations, the input imagery can be a three-dimensional point cloud of LIDAR data. To generate the binary mask, the three-dimensional space can be divided into a plurality of voxels. The computing system can determine the amount of data (e.g., the number of LIDAR data points) included in each voxel and can classify each voxel as either sparse or non-sparse based on the amount of data included in such voxel (e.g., as described above using a threshold of zero or of some value greater than zero). Thus, in such example, the binary mask can be a three-dimensional mask that classifies each voxel in three-dimensional space as sparse or non-sparse.

Alternatively or additionally to the mask generation techniques described above, in some implementations, the computing system can include or leverage a machine-learned mask generation model to generate the binary mask. For example, the computing system can input the imagery into the machine-learned mask generation model and, in response, receive the binary mask as an output of the machine-learned mask generation model.

As one example, the machine-learned mask generation model can be a neural network, such as, for example, a convolutional neural network. For example, the machine-learned mask generation model can be viewed as an initial portion of a larger convolutional neural network that provides the prediction based on the relevant portions of the imagery. In some implementations, the machine-learned mask generation model can be jointly trained with the convolutional neural network that provides the prediction based on the relevant portions of the imagery in an end-to-end fashion (e.g., by backpropagating an error through all of the layers sequentially).

In one example, the machine-learned mask generation model can be trained or pre-trained based at least in part on training examples that include training imagery annotated with ground-truth labels of sparse sections and non-sparse sections (e.g., a training image and its corresponding "correct" mask). For example, the preprocessing techniques described above (e.g., projection plus amount of data analysis) can be used to generate training data for the machine-learned mask generation model. In another example, the training examples can include segmentation masks used to pre-train the mask generation portion.

In some implementations, at training time, an approximation of a sparse convolution can be performed by directly multiplying the results with a dense binary mask. In some implementations, at training time, the mask is not constrained to be binary in nature, while the mask is constrained or processed to be binary at inference time. This can avoid the problem of non-differentiable binary variables.

As another example technique to generate the binary mask, in some implementations, the computing system can generate the binary mask by identifying a region of interest within the imagery. The computing system can classify each section included in the region of interest as non-sparse while classifying each section that is not included in the region of interest as sparse.

As one example, the region of interest can be based at least in part on context data associated with an autonomous vehicle. For example, the context data associated with the autonomous vehicle can include a heading of the autonomous vehicle, a trajectory associated with the autonomous vehicle, and/or other state data associated with the autonomous vehicle or other objects in the surrounding environment.

Thus, to provide one example, portions of the imagery that depict regions of the surrounding environment that are "in front of" the autonomous vehicle and/or regions of the surrounding environment through which the autonomous vehicle expects to travel can be considered to be the region of interest. As such, portions of the imagery that correspond to regions of the surrounding environment that are behind the autonomous vehicle can be classified as sparse and not-convolved over, thereby improving processing speed and efficiency. Further, this example implementation can assist in reducing a delay or latency associated with collection of LIDAR data, since the LIDAR system is not required to perform a complete 360 degree "sweep" but instead the LIDAR data can be collected and processed as soon as the LIDAR system has captured imagery that corresponds to the region of interest.

As another example, the region of interest can be based at least in part on a confidence metric associated with one or more predictions previously obtained relative to a scene depicted by the imagery. For example, portions of the imagery for which the corresponding predictions have low confidence can be included in the region of interest while portions of the imagery for which the corresponding predictions have high confidence can be excluded from the region of interest. In such fashion, portions of the imagery that have already been analyzed with high-confidence can be "ignored" since one would expect any further predictions from the convolutional neural network to be redundant, while portions of the imagery that have already been analyzed with low-confidence can be included in the region of interest so that the convolutional neural network provides an additional prediction with respect to such portions as "a second opinion".

To provide an example, an autonomous vehicle can include multiple sensors systems that have different modalities (e.g., cameras versus LIDAR system). First imagery captured by a first sensor (e.g., a camera) can be analyzed to receive a first set of predictions (e.g., predictions that detect objects in the surrounding environment as depicted by the camera imagery). This first set of predictions can have a confidence metric associated with each prediction. For example, a first detected object (e.g., bicyclist) can have a high confidence while a second detected object (e.g., pedestrian) or lack of detected object can have a low confidence assigned thereto. As such, a region of interest can be defined for second imagery captured by a second sensor (e.g., LIDAR system) based on the confidence metrics applied to the first imagery. For example, portions of the second imagery that may correspond to the first detected object may be excluded from the region of interest while portions of the second imagery that correspond to the second detected object (or lack of detected object) may be included in the region of interest. As such, portions of the imagery that correspond to previous predictions of high confidence can be classified as sparse and not-convolved over, thereby improving processing speed and efficiency.

As another example, the region of interest can be based at least in part on an attention mechanism that tracks, in an iterative fashion, where within the scene the attention of the processing system should be focused. For example, the locations at which portions of imagery were determined to be relevant in a past iteration can impact where the system searches for relevant imagery in a subsequent iteration (e.g., by guiding the region of interest based on the past imagery and/or predictions derived from the past imagery).

In some implementations, the region of interest-based masking techniques can be used in addition to the other masking techniques (e.g., pixel-by-pixel data analysis) to generate a combined, final mask. For example, the final binary mask can be an intersection of the multiple initial masks.

Once the computing system has generated the binary mask, the computing system can determine one or more relevant portions of the imagery based at least in part on the binary mask.

As an example, FIG. 3C depicts a graphical diagram of an example image 370 divided into example image portions according to example embodiments of the present disclosure. The boundaries of the example image portions are indicated by dashed lines. In the example illustrated in FIG. 3C, the portions 372*b* and 372*c* may be designated as relevant while the portion 372*a* (and all other unnumbered portions) may be designated as not relevant.

More particularly, as one example, in some implementations, the computing system can determine the one or more relevant portions of the imagery based at least in part on the binary mask by partitioning the imagery into a plurality of portions and classifying each portion as relevant or not relevant.

For example, each portion can contain two or more of the plurality of sections (e.g., pixel/voxel). The portions can be overlapping or non-overlapping. The portions can be uniformly sized or non-uniformly sized. The portions can have a predefined size or can be dynamically fitted around the non-sparse sections. The size of the portions can be different and individually optimized for different applications.

In one example, the portions can be predefined and uniformly sized rectangles or boxes (e.g., depending on whether the imagery is two-dimensional or three-dimensional), which can also be referred to as "tiles". For example, each tile can cover a 9 pixel by 9 pixel area.

The computing system can classify each portion as either relevant or not relevant based at least in part on the respective classifications of the sections contained in such portion as either sparse or non-sparse. For example, in some implementations, if any amount of the sections included in the portion were classified as non-sparse, then the computing system can classify such portion as relevant, so that only portions that include no sections that were classified as non-sparse are classified as non-relevant. As another example, in some implementations, the computing system can compare the number of sections classified as non-sparse included in a portion to a threshold number of sections (e.g., three sections) to determine whether such portion is relevant or non-relevant.

In another example, the relevant portions can be fitted around the non-sparse sections using a clustering/fitting algorithm. For example, the algorithm can seek to minimize both a total number of relevant portions and a total area covered by the relevant portions.

Thus, portions (e.g., tiles) of the input imagery can be designated as relevant and can be extracted from the imagery for input into the convolutional neural network. For example, extracting the relevant portions of the imagery can include cropping the imagery or otherwise isolating the imagery data that corresponds to each relevant portion.

Example Sparse Blocks Network (SBNet)

The present disclosure demonstrates that block sparsity can be exploited to significantly reduce the computational complexity of standard convolutional and dense layers in deep neural networks. In particular, in many instances, the input data to a convolutional neural network has block-structured sparsity. For example, the neighborhood of a zero-valued pixel is also likely to be zero. Therefore, in some implementations, instead of skipping computation on at pixel level, a network can be configured to skip computation for an entire block of activations.

In some implementations, block sparsity can be defined in terms of a mask that can be given by the problem definition or can be computed with low cost operations. Example techniques for generating such a mask are described throughout the present disclosure. As one example, in some implementations, a road map can be exploited for LIDAR object detection, and a general model-predicted attention map can be exploited for camera-based object detection. In some implementations, for speed-up purposes, the computation mask can be fixed for every layer in the network, while in other implementations it can be generalized to be different per layer.

Figure 5:
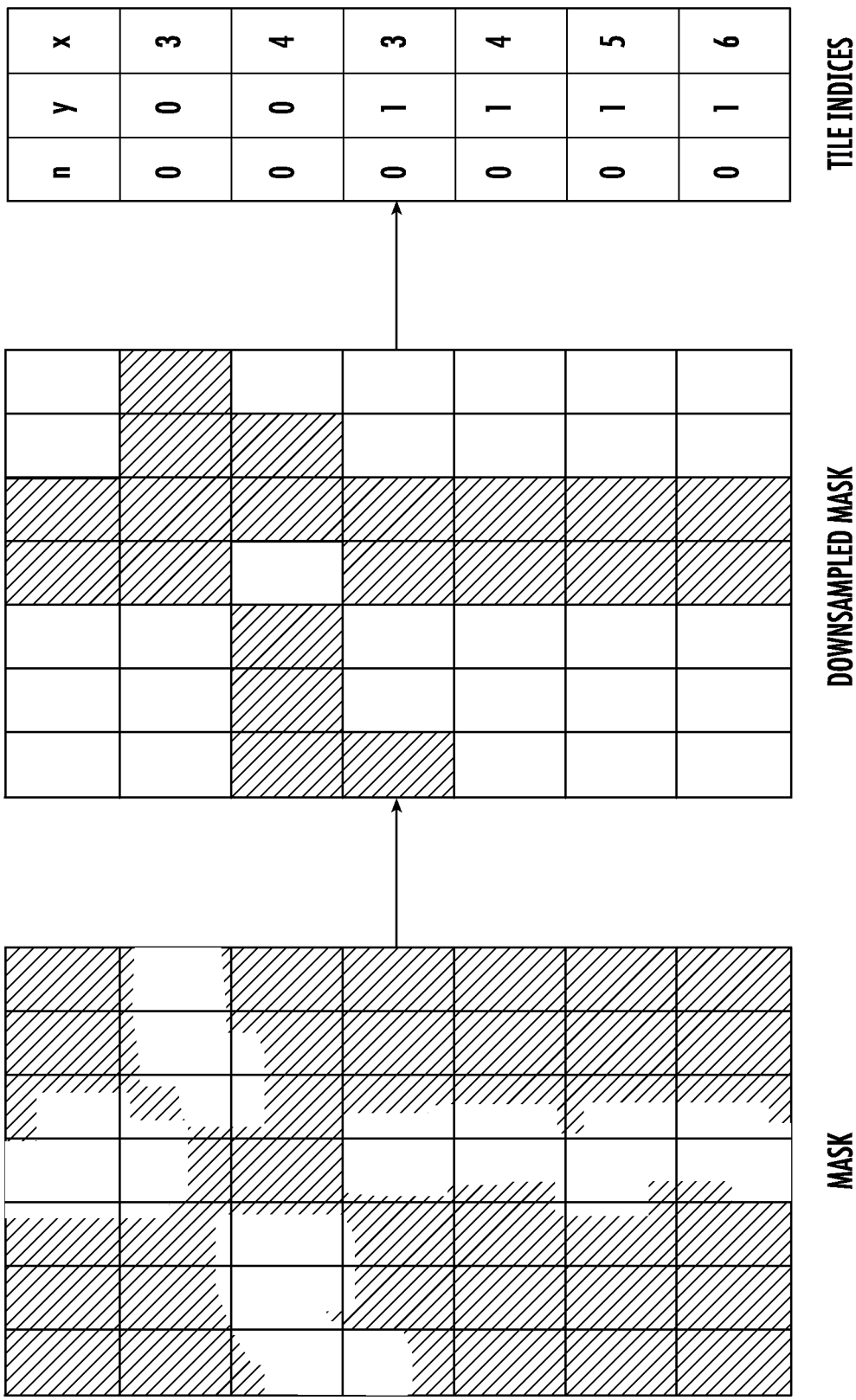
FIG. 5 depicts a graphical diagram of an example rectangular tiling for converting a dense binary mask into sparse locations according to example embodiments of the present disclosure.

Generally, there are two major building blocks of the sparse block-wise convolution described herein:

Reduce mask to indices: A first stage can include converting a binary mask into sparse indices, where each index represents the location of the corresponding block in the input tensor. For example, each index can represent a rectangular block of size h×w. As one example, FIG. 5 provides a graphical diagram of an example rectangular tiling for converting a dense binary mask into sparse locations.

Figure 6:
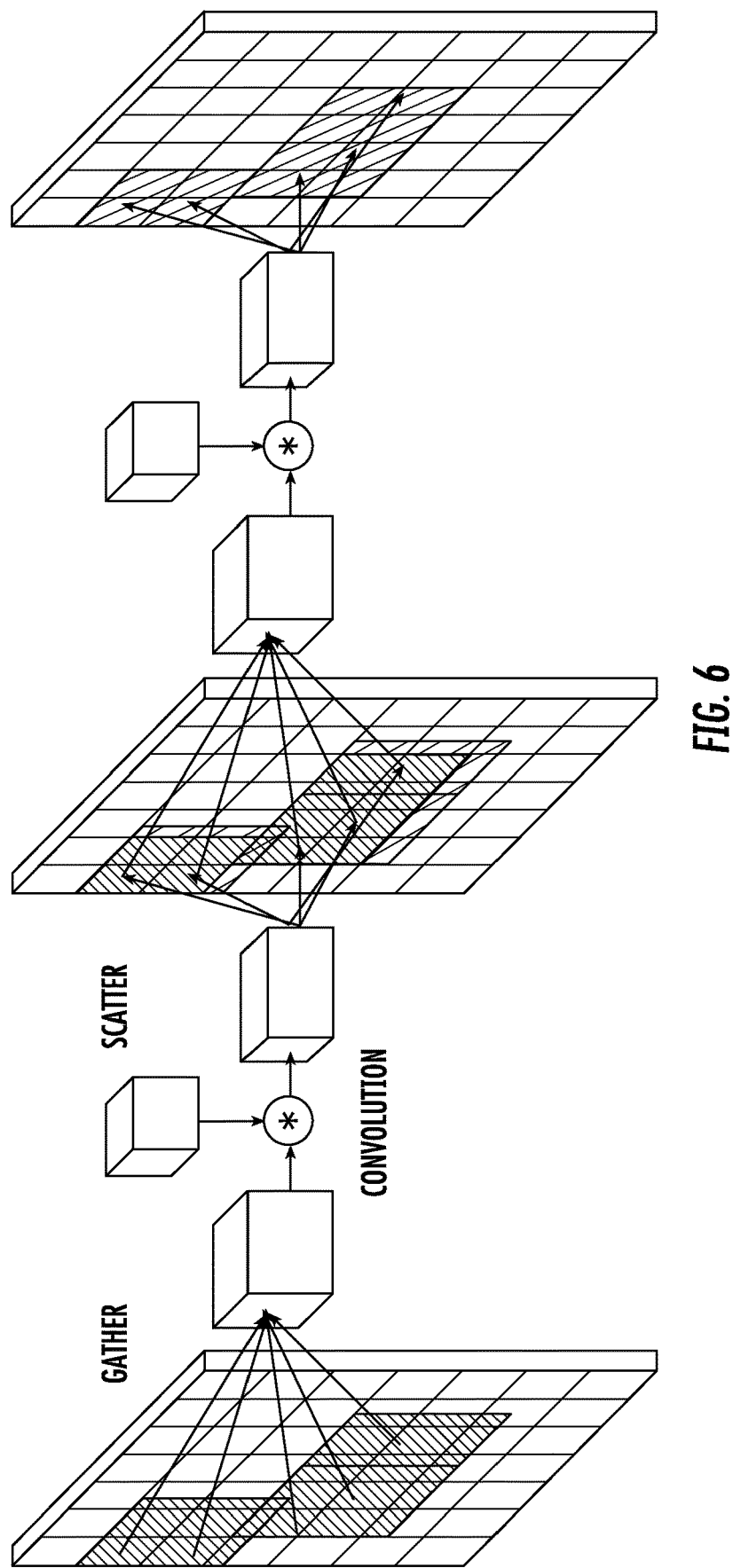
FIG. 6 depicts a graphical diagram of an example sparse gathering/scattering operation as performed by a proposed tiled sparse convolution module according to example embodiments of the present disclosure.

Sparse gathering/scattering operations: A second stage can include sparse gathering and scattering operations. In some implementations, for gathering, the computing system can extract a block from the input tensor, given the start location (e.g., index) and the size of the block. Scattering is the reverse operation where the input tensor is updated with some data and their locations. As one example, FIG. 6 provides a graphical diagram of an example sparse gathering/scattering operation, as performed by a proposed tiled sparse convolution module.

In the remainder of this section, the details of the above two building blocks are further described. Next, a residual unit for the sparse block is discussed. The residual unit can group several layers of computation into sparse blocks. Example implementations details are also provided.

Reduce Mask to Sparse Indices

Consider a feature map of size H×W×C. This is discussed with reference to the case of 2D convolutions but it also applicable to arbitrary tensor inputs. Let $M \in \{0,1\}^{H \times W}$ be the binary mask representing the sparsity pattern. Aspects of the present disclosure take advantage of non-sparse convolution operations as they have been heavily optimized. Towards this goal, the sparse indices can be tiled with a set of rectangles. Unfortunately, covering any binary shape with a minimal number of rectangles in an NP complete problem. Furthermore, having rectangles that are of different shapes is not hardware friendly because of its difficulty to process different output dimensions in parallel. Therefore, some implementations of the present disclosure have a uniform block size, so that the gathered blocks can be batched together to require one single convolution operation.

In signal processing, "overlap-add" and "overlap-save" are two partitioning schemes for performing convolutions with very long input signals. In some implementations, the sparse tiling algorithm can be an instantiation of the "overlap-save" algorithm where overlapping blocks are gathered, but in the scattering stage, each thread writes to non-overlapping blocks so that the writings are independent. Knowing the block sizes and overlap sizes, a simple pooling operation can be performed (e.g., max pooling or average pooling) to downsample the input mask. The resulting non-zero locations are the block locations from which patches are extracted. As one example, FIG. 5 provides a graphical diagram of an example rectangular tiling for converting a dense binary mask into sparse locations.

Sparse Gathering/Scattering

In some implementations, sparse gathering and scattering operations can convert the network between dense and sparse modes. In some implementations, unlike kernels that are implemented in deep learning libraries (e.g., tf.gather_nd,tf.scatter_nd), the proposed kernel not only operates on dense indices but also expands spatially to its neighborhood window.

Example gather kernel: Given a list of non-sparse indices of size [B, 3], which are the center locations of the blocks, and B is the number of non-sparse blocks, the blocks can then be sliced out of the 4-d [N×H×W×C] input tensor along height and width dimensions, and stacked along the batch dimension to produce a tensor of [B×h×w×C].

Example scatter kernel: Scatter can perform the reverse operation of gather, reusing the same input mask and block index list. The input to scatter kernel can be a tensor of shape [B×h'×w'×C]. The size of h' and w' can be computed based on a VALID (e.g., unpadded) convolution. If the inner convolution has kernel size [$k_h$, $k_w$] and strides [$s_h$, $s_w$], then $$h' = \frac{h - k_h + 1}{s_h}, \text{ and } w' = \frac{w - k_w + 1}{s_w}.$$

In the scatter kernel, the content of the convolution results can be copied back to the full activation tensor.

In some implementations, the overhead of gather/scatter operations can be amortized across entire columns of a convolutional neural network. As one example, in some instances, the column can be a ResNet block, but the columns can be larger as well.

Figure 7:
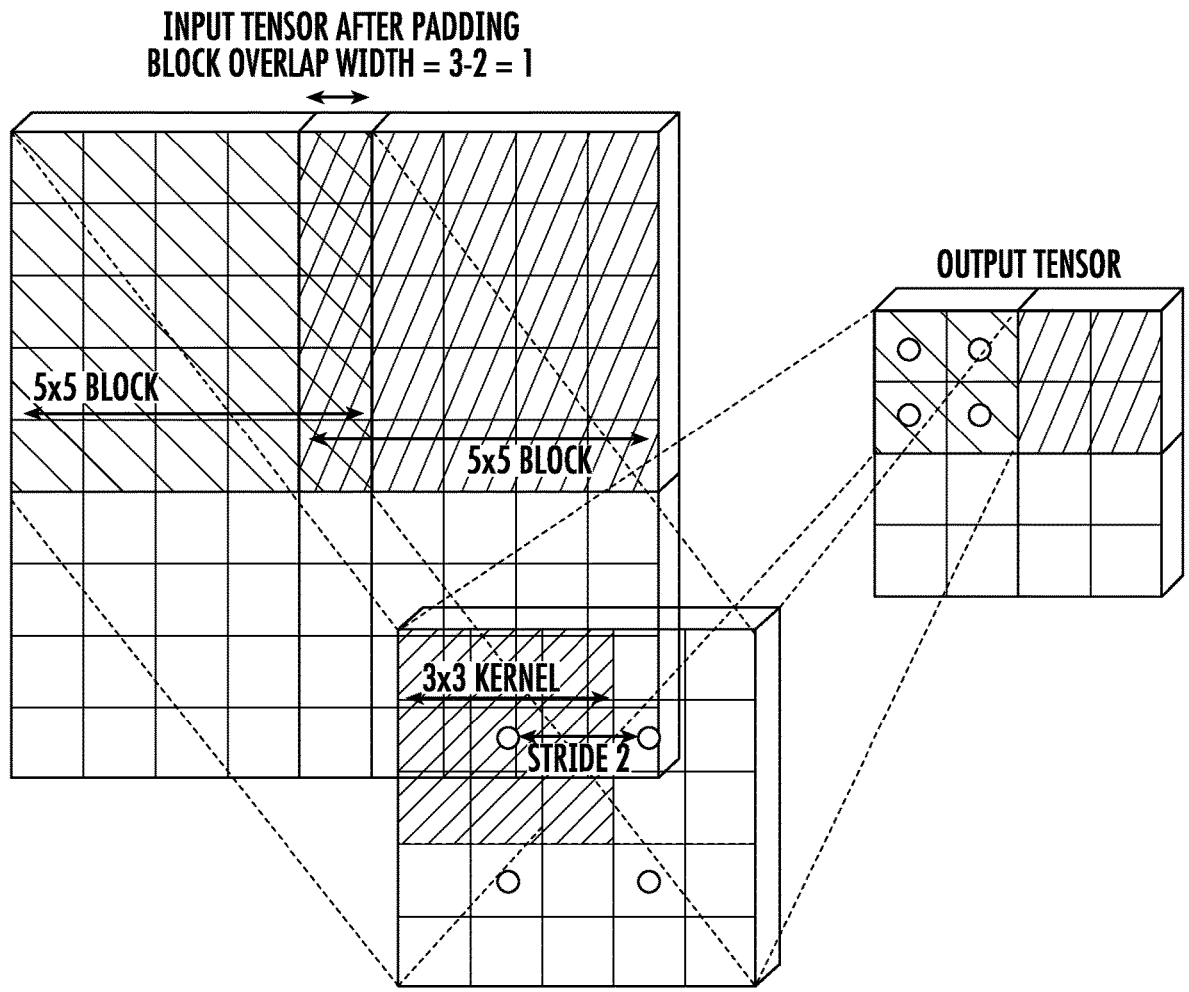
FIG. 7 depicts a graphical diagram of a simplified example of input and output tensors according to example embodiments of the present disclosure.

FIG. 7 provides a graphical diagram of a simplified example of input and output tensors according to example embodiments of the present disclosure. In particular, the simplified example of FIG. 7 has a block size of 5, a kernel size of 3×3, and kernel strides of 2×2. Block strides can be computed as k-s=3-2=1.

Sparse Residual Units

Figure 8:
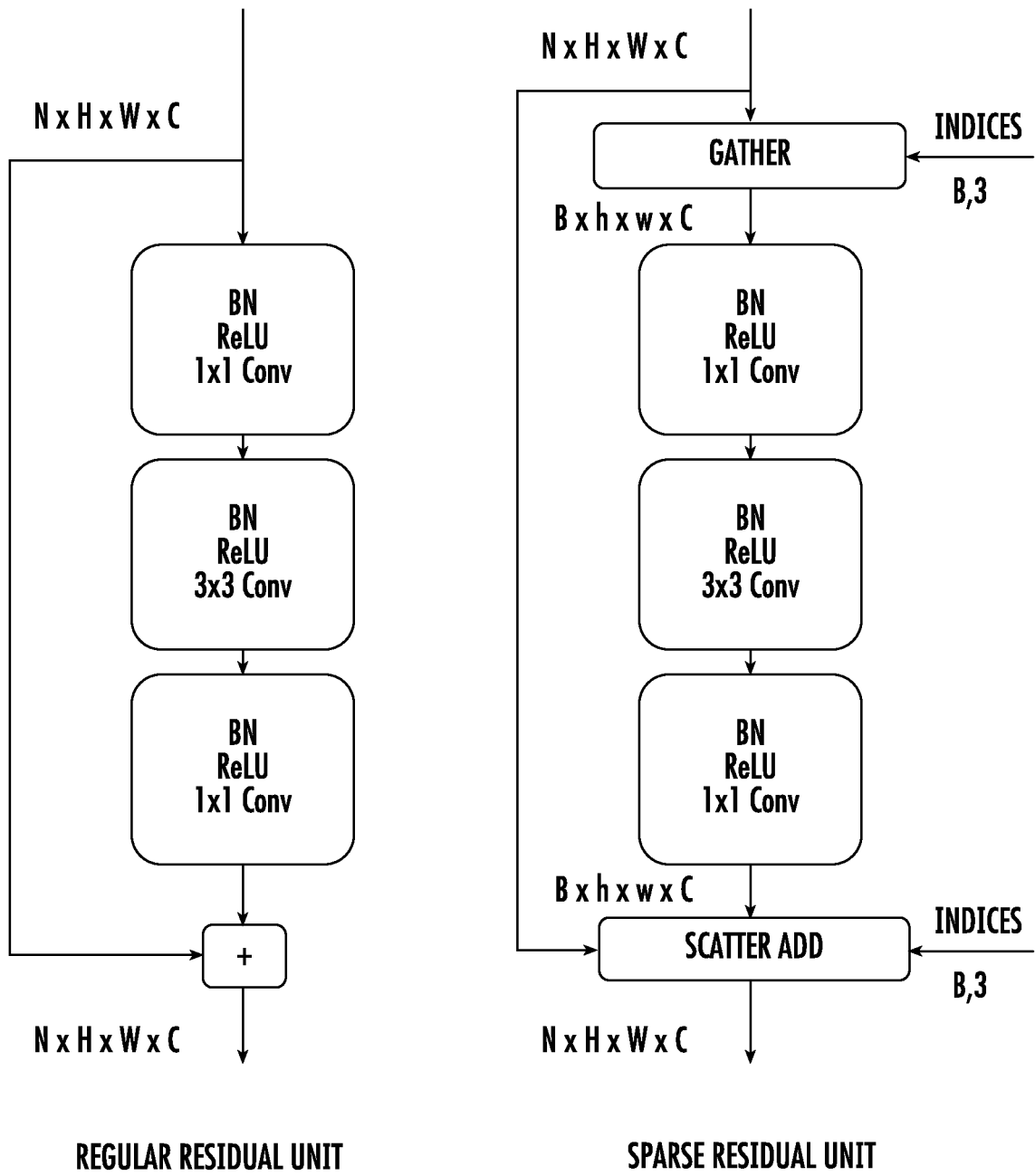
FIG. 8 provides graphical diagrams of an example regular residual unit and an example sparse residual unit according to example embodiments of the present disclosure.

The sparse block convolutions proposed herein also integrate well with residual units. In some implementations, a single residual unit contains three convolution, batch norm, and ReLU layers, all of which can be operated under sparse mode. The total increase in receptive field of a residual unit can be the same as a single 3×3 convolution. Therefore, in some implementations, all nine layers can share a single gathering and scattering operation without growing the overlap area between blocks. In addition to the computation savings, batch-normalizing across non-sparse elements contributes to better performance since it ignores non-valid data that may introduce noises to the statistics. As one example, FIG. 8 provides graphical diagrams of an example regular residual unit and an example sparse residual unit according to example embodiments of the present disclosure. In particular, FIG. 8 shows a computation graph of the sparse residual unit. In some implementations, a neural network can include a plurality of sparse residual units (e.g., stacked one after the other).

In some implementations, end-to-end training of sparse networks is required since the batch normalization statistics may be different between full scale activations and dense-only activations. In some implementations, the gradient of a scatter operation is simply the gather operation with the same precomputed block indices executed on the next layer's backpropagated gradient tensor and vice versa since gather/scatter act as a mask while backpropagating the gradient. When calculating the gradients of an overlapping gather operation, the scatter may perform atomic addition of gradients on the edges of overlapping tiles.

Example Implementation Details

One aspect of the present disclosure is an implementation of a block convolution algorithm using customized CUDA kernels. As has been shown experimentally, this results in significant speed up in terms of wall-clock time. Example implementation details are provided below.

Fused downsample and indexing kernel: To minimize the intermediate outputs between kernels, the downsample and indexing kernels can be fused into one. Inside each tile, a fused max or average pooling operation can be computed followed by writing out the block index into a sequential index array using GPU atomics to increment the block counter. Thus the input is a [N×H×W] tensor and the output is a list of [B, 3] sparse indices referring to full channel slices within each block.

Fused transpose and gathering/scattering kernel: When doing 2D spatial gather and scatter, NHWC format can be preferred because of the spatial affinity: in NHWC format, every memory block of size w×C is contiguous, whereas in NCHW format, only every block of size w is contiguous. Because of cuDNN's native performance favoring NCHW convolutions and batch normalizations, an example gather/scatter kernel of the present disclosure also fuses the transpose from NHWC to NCHW tensor format inside the same kernel. This also saves a memory round-trip for doing additional transpose operations. Under this implementation, the gather kernel outputs tensor of shape [B, C, h, w], and the scatter kernel takes tensor of shape [B, C, h', w'].

Fused scatter-add kernel for residual blocks: For ResNet architecture during inference, the input tensor can be reused for output so that an extra memory allocation is avoided and there is no need to wipe the output tensor to be all zeros. In some implementations, a fused kernel of 2D scatter and addition can be used, where only the non-sparse locations are updated by adding the convolution results back to the input tensor. If the convolution layer has stride larger than 1, one can use the output tensor in the shortcut connection in ResNet architecture as the base tensor, and update non-sparse results on top.

Example Methods

Figure 4:
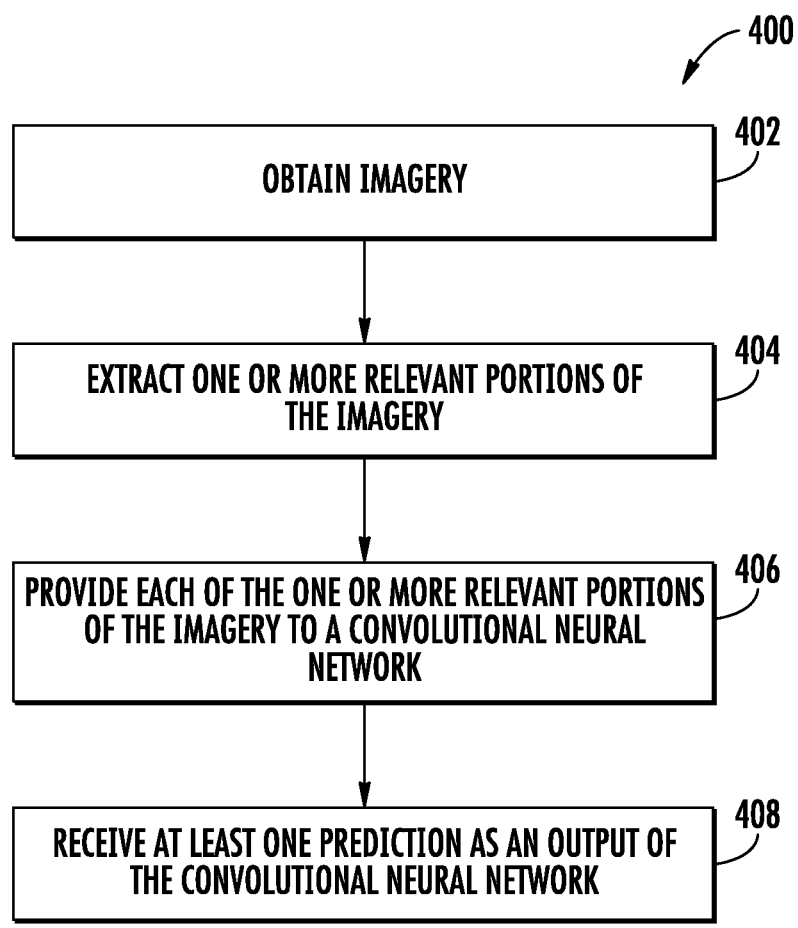
FIG. 4 depicts a flow chart diagram of an example method to apply a convolutional neural network to sparse imagery according to example embodiments of the present disclosure.

FIG. 4 depicts a flow chart diagram of an example method 400 to apply a convolutional neural network to sparse imagery according to example embodiments of the present disclosure.

At 402, a computing system can obtain imagery. As examples, the imagery can include LIDAR data and/or visible spectrum imagery. The imagery can be two-dimensional or three-dimensional. In some implementations, the computing system can preprocess three-dimensional imagery by projecting three-dimensional imagery onto a two-dimensional view.

At 404, the computing system can extract one or more relevant portions of the imagery.

In some implementations, extracting the one or more relevant portions of the imagery at 404 can include identifying one or more non-sparse regions of the imagery and extracting the one or more relevant portions that respectively correspond to the one or more non-sparse regions.

In some implementations, extracting the one or more relevant portions of the imagery at 404 can include generating a binary mask that classifies each of a plurality of sections of the imagery as either sparse or non-sparse and determining the one or more relevant portions of the imagery based at least in part on the binary mask.

As one example, generating the binary mask can include dividing the imagery into the plurality of sections; determining, for each of the plurality of sections, an amount of data included in such section; and classifying each section as either sparse or non-sparse based at least in part on the amount of data included in such section.

As another example, generating the binary mask can include inputting the imagery into a machine-learned mask generation model and receiving the binary mask as an output of the machine-learned mask generation model.

As yet another example, generating the binary mask can include identifying a region of interest within the imagery; classifying each section included in the region of interest as non-sparse; and classifying each section that is not included in the region of interest as sparse.

As one example, identifying the region of interest can include identifying the region of interest based at least in part on context data associated with an autonomous vehicle. For example, the context data can include a heading of the autonomous vehicle.

As another example, identifying the region of interest can include identifying the region of interest based at least in part on a confidence metric associated with one or more predictions previously obtained relative to a scene depicted by the imagery.

In some implementations, determining the one or more relevant portions of the imagery based at least in part on the binary mask can include partitioning the imagery into a plurality of portions. Each portion can contain two or more of the plurality of sections. Determining the one or more relevant portions can further include classifying each portion as either relevant or not relevant based at least in part on the respective classifications of the sections contained in such portion as either sparse or non-sparse.

At 406, the computing system can provide each of the one or more relevant portions of the imagery to a convolutional neural network. In some implementations, providing each of the one or more relevant portions of the imagery to the convolutional neural network at 406 can include stacking the one or more relevant portions in a depth-wise fashion to form a tensor and inputting the tensor into the convolutional neural network In some implementations, a kernel of the machine-learned convolutional neural network has a kernel size that is larger than at least one of one or more portion sizes respectively associated with at least one relevant portion of the one or more relevant portions of the imagery. In such implementations, providing each of the one or more relevant portions of the imagery to the convolutional neural network at 406 can include identifying at least one kernel portion that respectively corresponds to the at least one relevant portion for which the kernel size is larger than the corresponding portion size and computing a layer of the machine-learned convolutional neural network with respect to the at least relevant portion by computing only the identified kernel portion against the at least one relevant portion.

In some implementations, providing each of the one or more relevant portions of the imagery to the convolutional neural network at 406 can include inputting each of the one or more relevant portions into respective parallel instances of the machine-learned convolutional neural network in parallel.

At 408, the computing system can receive at least one prediction as an output of the convolutional neural network. In some implementations, receiving the prediction from the machine-learned convolutional neural network at 408 can include patching one or more prediction results to the imagery. For example, the one or more prediction results that are patched can respectively correspond to the one or more relevant portions.

In some implementations, the imagery can be imagery captured by one or more sensors of an autonomous vehicle and the prediction from the machine-learned convolutional neural network can be a detection of an object in a surrounding environment of the autonomous vehicle.

In some implementations, the imagery can be imagery captured by one or more sensors of an autonomous vehicle and the prediction from the machine-learned convolutional neural network can be a predicted trajectory for an object in a surrounding environment of the autonomous vehicle.

In some implementations, method 400 can further include determining a motion plan for the autonomous vehicle based at least in part on the at least one prediction output by the convolutional neural network and controlling motion of the autonomous vehicle based at least in part on the motion plan.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

What is claimed is:

1. A computing system for processing imagery captured by one or more sensors of an autonomous vehicle, comprising:
   one or more processors;
   a machine-learned convolutional neural network; and
   one or more non-transitory computer-readable media that store instructions that, when executed by the one or more processors, cause the computing system to perform operations, the operations comprising:
      obtaining the imagery captured by the one or more sensors of the autonomous vehicle;
      extracting one or more relevant portions of the imagery, the one or more relevant portions being less than an entirety of the imagery, wherein extracting the one or more relevant portions of the imagery comprises:
         generating a binary mask that classifies each of a plurality of sections of the imagery as either sparse or non-sparse; and
         determining the one or more relevant portions of the imagery based at least in part on the binary mask;
      providing each of the one or more relevant portions of the imagery to the machine-learned convolutional neural network, wherein the machine-learned convolutional neural network performs one or more convolutions respectively on each of the one or more relevant portions; and
      receiving a prediction from the machine-learned convolutional neural network based at least in part on the one or more convolutions respectively performed on each of the one or more relevant portions.

2. The computing system of claim 1, wherein:
   the computing system is on-board the autonomous vehicle;
   the imagery comprises one or both of:
      LIDAR data captured by a LIDAR system mounted on the autonomous vehicle; and
      one or more image frames captured by one or more cameras mounted on the autonomous vehicle;
   the prediction from the machine-learned convolutional neural network comprises one or both of:
      detection of an object in a surrounding environment of the autonomous vehicle; and
      a predicted trajectory for the object in the surrounding environment of the autonomous vehicle.

3. The computing system of claim 1, wherein the operations further comprise controlling motion of the autonomous vehicle based at least in part on the prediction received from the machine-learned convolutional neural network.

4. The computing system of claim 1, wherein extracting the one or more relevant portions of the imagery comprises:
identifying one or more non-sparse regions of the imagery; and
extracting the one or more relevant portions that respectively correspond to the one or more non-sparse regions.

5. The computing system of claim 1, wherein generating the binary mask comprises:
dividing the imagery into the plurality of sections;
determining, for each of the plurality of sections, an amount of data included in such section; and
classifying each section as either sparse or non-sparse based at least in part on the amount of data included in such section.

6. The computing system of claim 1, wherein generating the binary mask comprises:
inputting the imagery into a machine-learned mask generation model; and
receiving the binary mask as an output of the machine-learned mask generation model.

7. The computing system of claim 1, wherein generating the binary mask comprises:
identifying a region of interest within the imagery;
classifying each section included in the region of interest as non-sparse; and
classifying each section that is not included in the region of interest as sparse.

8. The computing system of claim 7, wherein identifying the region of interest comprises identifying the region of interest based at least in part on context data associated with an autonomous vehicle.

9. The computing system of claim 8, wherein the context data associated with the autonomous vehicle comprises a heading of the autonomous vehicle.

10. The computing system of claim 7, wherein identifying the region of interest comprises identifying the region of interest based at least in part on a confidence metric associated with one or more predictions previously obtained relative to a scene depicted by the imagery.

11. The computing system of claim 1, wherein determining the one or more relevant portions of the imagery based at least in part on the binary mask comprises:
partitioning the imagery into a plurality of portions, each portion containing two or more of the plurality of sections; and
classifying each portion as either relevant or not relevant based at least in part on the respective classifications of the sections contained in such portion as either sparse or non-sparse.

12. The computing system of claim 1, wherein:
providing each of the one or more relevant portions of the imagery to the machine-learned convolutional neural network comprises:
stacking the one or more relevant portions in a depthwise fashion to form a tensor; and
inputting the tensor into the convolutional neural network; and
receiving the prediction from the machine-learned convolutional neural network comprises patching one or more prediction results to the imagery, wherein the one or more prediction results respectively correspond to the one or more relevant portions.

13. The computing system of claim 1, wherein:
a kernel of the machine-learned convolutional neural network has a kernel size that is larger than at least one of one or more portion sizes respectively associated with at least one relevant portion of the one or more relevant portions of the imagery; and
providing each of the one or more relevant portions of the imagery to the machine-learned convolutional neural network comprises:
identifying at least one kernel portion that respectively corresponds to the at least one relevant portion for which the kernel size is larger than the corresponding portion size; and
computing a layer of the machine-learned convolutional neural network with respect to the at least relevant portion by computing only the identified kernel portion against the at least one relevant portion.

14. The computing system of claim 13, wherein the machine-learned convolutional neural network performs only valid convolutions in which a kernel size is smaller than a corresponding portion size.

15. The computing system of claim 1, wherein the machine-learned convolutional neural network includes a residual block and the residual block is configured to provide a sparse update to hidden features.

16. An autonomous vehicle, comprising:
one or more sensors that capture imagery;
one or more processors;
a machine-learned convolutional neural network; and
one or more non-transitory computer-readable media that store instructions that, when executed by the one or more processors, cause the autonomous vehicle to perform operations, the operations comprising:
obtaining the imagery captured by the one or more sensors of the autonomous vehicle;
extracting one or more relevant portions of the imagery, the one or more relevant portions being less than an entirety of the imagery, wherein extracting the one or more relevant portions of the imagery comprises:
generating a binary mask that classifies each of a plurality of sections of the imagery as either sparse or non-sparse; and
determining the one or more relevant portions of the imagery based at least in part on the binary mask;
providing each of the one or more relevant portions of the imagery to the machine-learned convolutional neural network, wherein the machine-learned convolutional neural network performs one or more convolutions respectively on each of the one or more relevant portions; and
receiving a prediction from the machine-learned convolutional neural network based at least in part on the one or more convolutions respectively performed on each of the one or more relevant portions.

* * * * *